United States Patent [19]
Draganov

[11] 3,983,040

[45] Sept. 28, 1976

[54] FIRE-RETARDANT COMPOSITION AND PROCESS OF PRODUCING SAME

[76] Inventor: Samuel M. Draganov, 17966 Orange Tree Lane, Tustin, Calif. 92680

[22] Filed: Aug. 7, 1975

[21] Appl. No.: 602,554

[52] U.S. Cl. .................................. 252/8.1; 252/2; 106/15 FP
[51] Int. Cl.² .......................................... C09K 3/28
[58] Field of Search .............. 252/8.1, 2; 106/15 FP; 117/136

[56] References Cited
UNITED STATES PATENTS
3,860,692  1/1975  Nies et al. ......................... 252/8.1 X Primary Examiner—Stephen J. Lechert, Jr.
Attorney, Agent, or Firm—Mallinckrodt & Mallinckrodt

[57] ABSTRACT

A fire-retardant composition of matter is produced as the dried and pulverized reaction product of treating a calcium, sodium, magnesium, or potassium borate ore with sulfuric acid. The composition is especially useful for application as a dry powder to cellulosic materials, but may be made into a liquid suspension for spray application or into a paste for some fire retardant applications.

10 Claims, No Drawings

FIRE-RETARDANT COMPOSITION AND PROCESS OF PRODUCING SAME

BACKGROUND OF THE INVENTION

Field

The invention is in the field of fire-retardant compositions and of processes for producing them.

State of the Art

Boric acid in powder form has long been used as a fire retardant for cellulosic materials, such as cotton batting and ground waste paper insulation. Boric acid is traditionally produced by treating a borax solution with sulfuric acid and recovering the boric acid crystals that form upon cooling the solution. Boric acid has been made directly from a borate ore by the procedural steps of pulverizing the ore, mixing the resulting powder with water to form an aqueous slurry, mixing the slurry with sulfuric acid, separating the resulting solids from the solution, crystallizing boric acid by cooling the solution, and separating the boric acid crystals from the residual solution. Whether made from borax or from a borate ore, the product has been a commercially pure boric acid. The elimination of sulfates has been regarded as necessary when utilizing ore as the source material.

SUMMARY OF THE INVENTION

A primary objective in the making of the present invention has been the economical production of an effective fire-retardant composition that can be used as a substitute for the boric acid previously employed as a fire retardant.

This has been achieved by my discovery that apparently there is synergism between boric acid and sulfate constituents in the reaction product resulting from the treatment of calcium, sodium, magnesium, or potassium borate ores with sulfuric acid, and that an unexpectedly effective fireretardant composition of matter can be economically produced from borate ores that yield both sulfate and boric acid constituents upon treatment of the ore with sulfuric acid. It is only necessary to dry and pulverize the reaction product containing both the sulfate and the boric acid constituents.

Commonly available varieties of borate ores contain such calcium or sodium borate minerals as colemanite, ulexite, howlite, tincal, and rasorite. Other borate ores may also contain these and/or magnesium and potassium borates. Although calcium, sodium, magnesium, and potassium sulfates are not in themselves fire retardants, the presence of one or more of these sulfates in the reaction product of a borate ore treated with sulfuric acid apparently contributes significantly to the fire-retardant properties of such reaction product. I have found that the dried and pulverized reaction product is almost as effective per unit quantity when applied to a cellulosic material, such as ground waste paper, as is the purified boric acid that has heretofore been employed for the purpose. Even though a somewhat greater quantity of the composition of the present invention is required to effect the same results as the purified boric acid customarily utilized for the purpose, the excess required is by no means as great as would be expected based on common knowledge that such sulfates are ineffective as fire retardants.

DETAILED DESCRIPTION OF PREFERRED EMBODIMENTS

It is preferred to utilize a calcium borate ore, since I have found that the synergistic action of calcium sulfate with the boric acid formed by the treatment of a calcium borate ore with sulfuric acid is effective as to both the flame and glow retardancy of the composition of the invention. Although such synergistic action of a sodium sulfate is substantially as effective so far as flame retardancy is concerned, it does not appear to be as effective so far as flow retardancy is concerned. Thus, predominantly calcium borate ores, such as colemanite and ulexite are presently regarded as most useful for purposes of the invention.

The ore is finally ground prior to treatment. Although the degree of fineness can vary, grinding the ore to a size of minus 200 mesh is ordinarily satisfactory for obtaining rapid and complete reaction with the sulfuric acid, which is applied directly to the ground ore in a suitable reaction vessel. It is advantageous to agitate the ore during the application thereto of the sulfuric acid, so as to obtain an intimate blending of the acid with the ore particles. It is also advantageous to add water during a final mixing stage to facilitate the desired reaction.

The acid is preferably added during a period of about one-half hour while the ore is being agitated, and the mixing of ore and acid is continued while water is being added to the mix. The reaction produces considerable heat, which aids in drying the reaction product during the mixing procedure as well as following its discharge from the reaction vessel. When the reaction product is dried sufficiently for handling, it is ground to a size from about minus 200 mesh to about minus 325 mesh, the dry powder constituting the fire-retardant composition of the invention.

For best results, the ore should contain from about 25% to 60% by weight boron oxide ($B_2O_3$). Lime is ordinarily present as a major constituent of borate ores. It does no harm other than to use up acid without contributing significantly to the final composition. Whenever practical, an ore low in lime and other gangue materials is used, but it is unnecessary to beneficiate an ore prior to processing it in accordance with the invention.

Typical examples of the invention are as follows:

EXAMPLE I

Two thousand pounds of a calcined and pulverized (minus 200 mesh) calcium borate ore, analyzing 50% $B_2O_3$ as colemanite mineral with the major impurity being limestone, was charged into stainless steel ribbon blender. Over a period of 30 minutes of operation of the blender, 1,273 pounds of sulfuric acid (66° Baume) were sprayed onto the agitated ore material from multiple nozzles. Immediately following this period of acid addition and blending, 876 pounds of water was added through the spray nozzles over a time period of 20 minutes while operation of the blender continued for mixing purposes. Mixing was continued for another 20 minutes while observing the reaction in the mixer. At such times as excessive dryness of the mix indicated the need for additional water, more water was supplied. The heat of the reaction promoted rapid drying, and at the end of the mixing period a hot and dry reaction product was discharged from the reaction vessel for further drying during atmospheric cooling. The cool and dry reaction product was then pulverized to provide a dry, pulverous composition of matter containing 48% boric acid and 40% calcium sulfate as well as minor impurities originally present in the ore as gangue. This composition was mixed with ground waste paper insulation material on the basis of 25% of the composition to 75% of the insulation material, yielding excellent fire-retardant properties. Added to cotton batting on the basis of 12.5% of the composition to 87.5% of the batting, it was found to be as effective as the use of 10% pure boric acid. All percentages were based on weight.

EXAMPLE II

Two-thousand pounds of a similarly sized calcium-sodium borate ore containing 62.8% ulexite mineral and 32% limestone were charged into the same stainless steel ribbon blender, and 1,057 pounds of sulfuric acid (66° Baume) were sprayed onto the agitated ore through the same multiple nozzles over a period of ½ hour. Following this blending procedure, two hundred seventy pounds of water were sprayed onto the mixture over a period of 10 minutes while mixing continued. Following this addition of water, mixing was continued for another 20 minutes with the same attention to excess drying of the ore as in Example I. At the end of this time a hot and dry reaction product was discharged from the reaction vessel. Such reaction product was pulverized following cooling to provide a fire-retardant composition of matter containing 34% boric acid and 60% calcium-sodium sulfates along with minor impurities originally contained in the ore as gangue. Excellent flame-retardancy was imparted to ground waste paper insulation material by intimately mixing such composition with such insulation material on the basis of 30% of the former to 70% of the latter. As in the previous example, all percentages are in terms of weight.

The dry, pulverant composition of the invention may be used directly in its powder form or may be mixed with water or other suitable liquid as a suspension for spraying onto material to be made fire retardant. Again, such dry, pulverant composition may be mixed with water or other suitable liquid to provide a paste for other applications as a fire-retardant material.

In general, preferred embodiments of the inventive composition will contain, by weight, from approximately 25% to approximately 60% boric acid constituent and from approximately 25% to approximately 75% sulfate constituent depending upon the character of the borate ore utilized.

Whereas, this invention is here described with respect to specific examples representing the best mode presently contemplated of carrying out the invention, what is claimed is particularly pointed out herebelow.

I claim:

1. A fire-retardant compositon of matter, comprising a particulate reaction product of a borate ore and sulfuric acid, said one having been selected from the group consisting of calcium, sodium, magnesium, and potassium borates, and mixtures thereof and said composition containing boric acid as a constituent of said reaction product, and a significant quantity of one or more sulfates selected from the group consisting of calcium, sodium, magnesium, and potassium sulfates, as a constituent of said reaction product.

2. A composition of matter in accordance with claim 1, wherein the dry and pulverous reaction product contains from approximately 25% to approximately 60% boric acid and from approximately 25% to approximately 75% sulfate.

3. A composition of matter in accordance with claim 2, wherein the sulfate is substantially all calcium sulfate.

4. A composition of matter in accordance with claim 1, wherein the reaction product is dry and pulverous.

5. A composition of matter in accordance with claim 1, wherein particles of the reaction product are suspended in a liquid medium for spraying application to a material to be made fire retardant.

6. A composition of matter in accordance with claim 1, wherein particles of the reaction product are admixed with a liquid vehicle to form a paste for application to a material to be made fire retardant.

7. A process for producing a fire-retardant composition of matter, comprising reacting a pulverized borate ore selected from the group consisting of calcium, sodium, magnesium, and potassium borates mixtures thereof, with sulfuric acid for a time sufficient to produce a reaction product containing a boric acid constituent and a sulfate constituent; drying the reaction product containing said constituents; and pulverizing the dried reaction product.

8. A process according to claim 7, wherein the borate ore contains from about 25% to about 60% by weight $B_2O_3$.

9. A process according to claim 7, wherein the reaction is carried out by gradually introducing and blending the sulfuric acid to and with the pulverized ore while agitating the latter; by thereafter adding water to the resulting mixture and mixing the water therewith until a substantially dry reaction product is obtained; and pulverizing the dried reaction product.

10. A process according to claim 7, wherein the introduction and blending of the ore and the sulfuric acid extends throughout a period of about one-half hour; wherein water is added over a period of about twenty minutes; and wherein mixing is continued for an additional period of about twenty minutes.

* * * * *

UNITED STATES PATENT OFFICE
CERTIFICATE OF CORRECTION

PATENT NO. : 3,983,040
DATED : September 28, 1976
INVENTOR(S) : Samuel M. Draganov It is certified that error appears in the above-identified patent and that said Letters Patent are hereby corrected as shown below:

In Claim 1, line 3, column 4, "one" should be --ore--.

In Claim 7, line 4, column 4, after "borates" there should be inserted --, --.

Signed and Sealed this

Fifth Day of April 1977

[SEAL]

Attest:

RUTH C. MASON
*Attesting Officer*

C. MARSHALL DANN
*Commissioner of Patents and Trademarks*